March 17, 1942.    C. DUBUQUE    2,276,767
SAFETY PULLEY BLOCK
Filed Oct. 26, 1939    5 Sheets-Sheet 1

INVENTOR
CHARLES DUBUQUE
BY Chapin + Neal
ATTORNEYS

March 17, 1942.  C. DUBUQUE  2,276,767
SAFETY PULLEY BLOCK
Filed Oct. 26, 1939  5 Sheets-Sheet 2
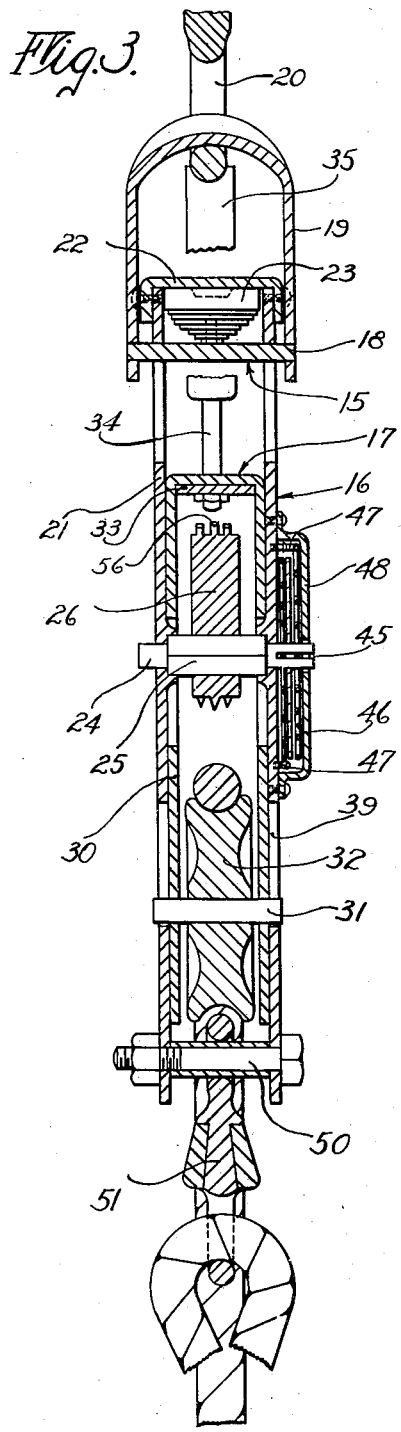
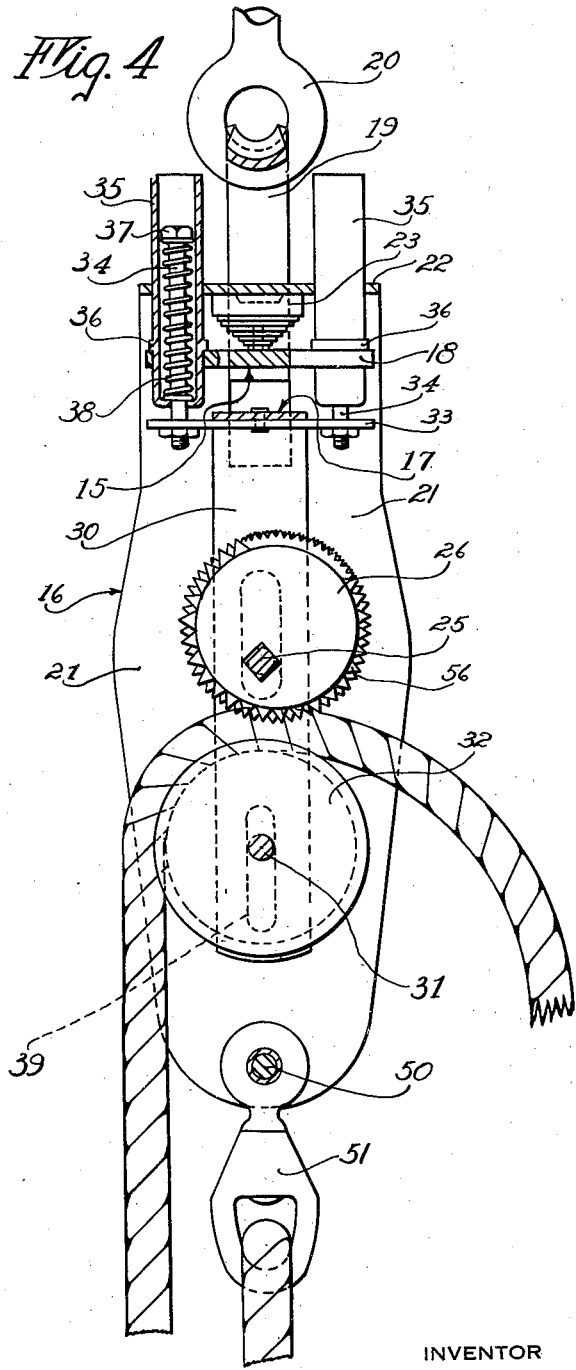
INVENTOR
CHARLES DUBUQUE
BY
Chapin & Neal
ATTORNEYS March 17, 1942.   C. DUBUQUE   2,276,767
SAFETY PULLEY BLOCK
Filed Oct. 26, 1939   5 Sheets-Sheet 3
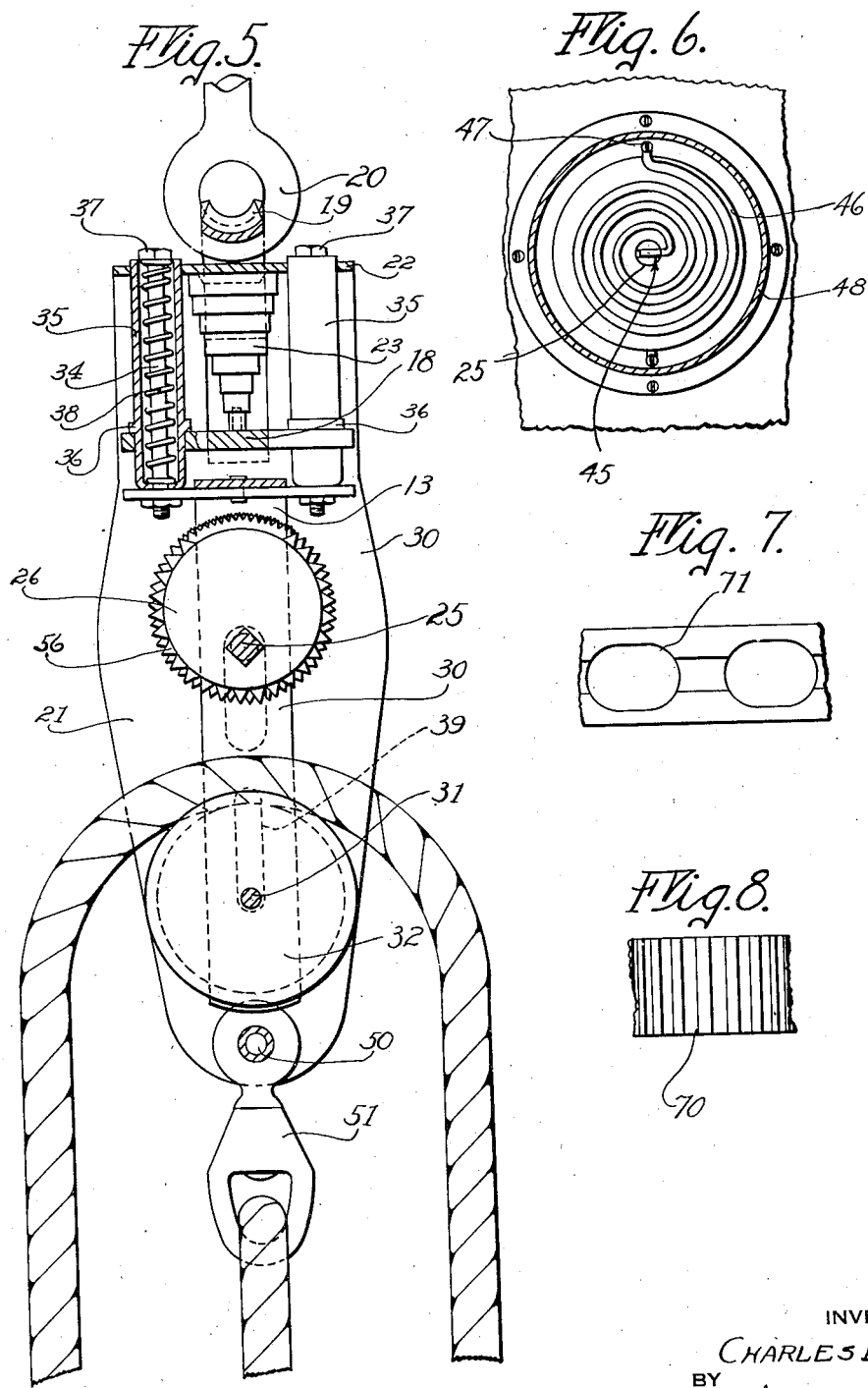
INVENTOR
CHARLES DUBUQUE
BY Chapin & Neal
ATTORNEYS March 17, 1942.   C. DUBUQUE   2,276,767
SAFETY PULLEY BLOCK
Filed Oct. 26, 1939   5 Sheets-Sheet 4
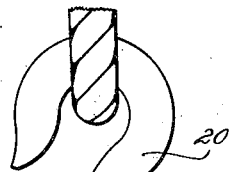
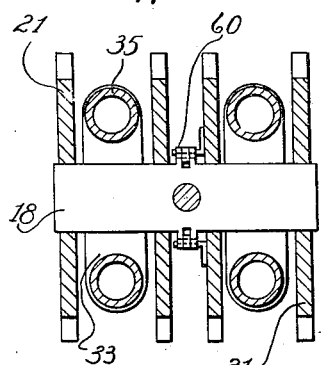
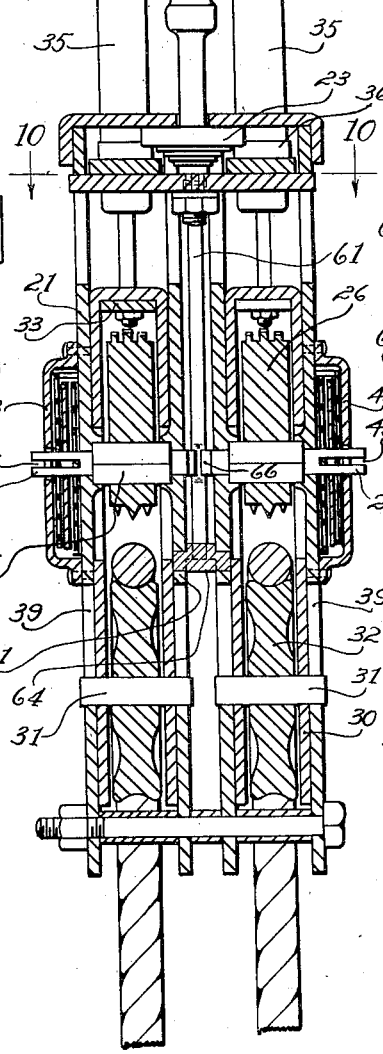
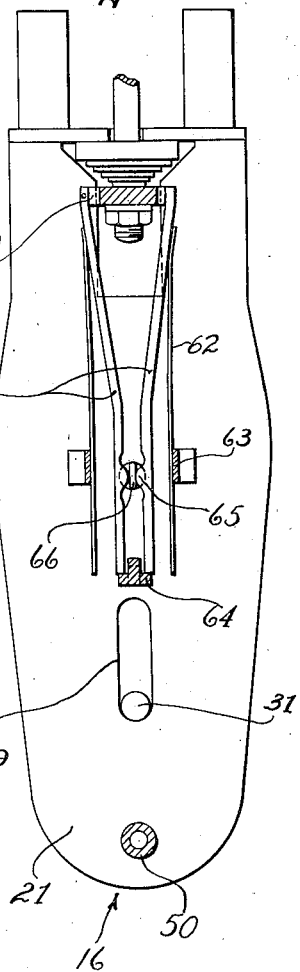
INVENTOR
CHARLES DUBUQUE
BY
Chapin & Neal
ATTORNEYS March 17, 1942. C. DUBUQUE 2,276,767
SAFETY PULLEY BLOCK
Filed Oct. 26, 1939   5 Sheets-Sheet 5
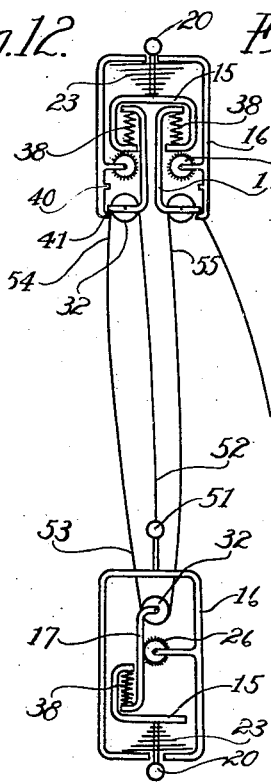
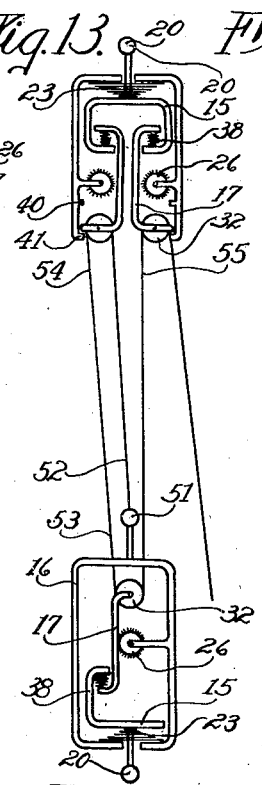
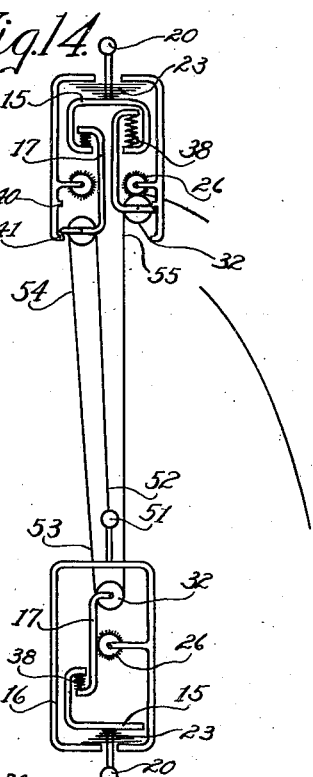
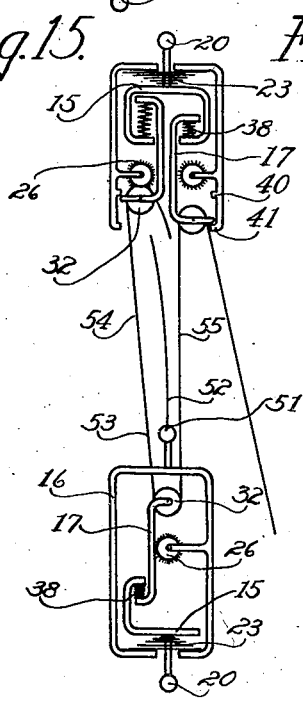
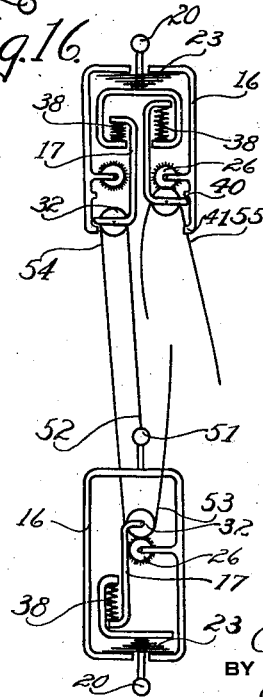
INVENTOR
CHARLES DUBUQUE
BY Chapin & Neal
ATTORNEYS Patented Mar. 17, 1942

2,276,767

UNITED STATES PATENT OFFICE 2,276,767

SAFETY PULLEY BLOCK

Charles Dubuque, Newark, N. J., assignor to George G. Morin, Holyoke, Mass.

Application October 26, 1939, Serial No. 301,348

6 Claims. (Cl. 254—188)

This invention relates to safety pulley blocks and in particular relates to improvements in safety pulley blocks of the type shown in my prior Patent 1,787,516.

The invention has for its object the construction of a safety pulley block in which complete and practically instantaneous protection may be obtained against breakage of any of the ropes running between the pulley blocks when these blocks are used in pairs in accordance with general practice. A further object is to provide a construction in which the safety construction will not interfere with the ease of threading a rope through the block or with the ease of disengaging a rope from the block after the safety construction has operated, and it is desired to replace the rope.

The manner in which these objects are accomplished will best be understood from the following description and claims in which Fig. 1 is a view showing two pulley blocks connected together, one of the blocks being of double and the other of single construction;

Fig. 3 is a transverse median section through the block shown in Fig. 2;

Fig. 4 is a view corresponding to Fig. 2 but showing the action when one of the ropes breaks;

Fig. 5 is a view similar to Fig. 2 showing the position of the parts when the rope is to be inserted in or removed from the block;

Fig. 6 is a detail of a spring shown in Fig. 3;

Figs. 7 and 8 are details of modified forms of the clamping wheel;

Fig. 9 is a view similar to Fig. 3 but showing the construction of a double block;

Fig. 10 is a section on line 10—10 of Fig. 9;

Fig. 11 is a median section through the device of Fig. 9; and

Figs. 12–16 are diagrammatic views illustrating the operation of the blocks under these conditions.

Figure 1:
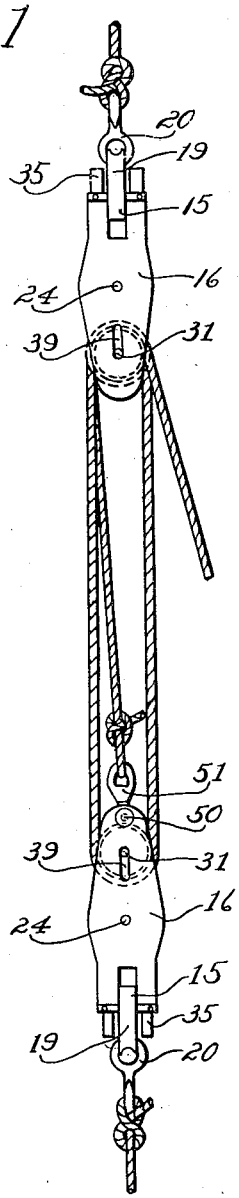

The blocks are formed of three frames 15, 16, and 17; indicated only diagrammatically in the last five figures. The frame 15 is formed of a plate 18 (Figs. 2 and 3) having a yoke 19 carrying an eye 20 to which one of the ropes may be attached. The frame 16 is formed of parallel plates 21 joined as shown in Fig. 3 by a cross piece 22 to form a box-like structure. A volute compression spring 23 is located between the plate 18 and the cross piece 22 so that the frame 16 always has a tendency to rise with respect to the frame 15. This is diagrammatically shown in Figs. 12–16. The plates 21 have bearings for the ends of an axle 24 squared at 25 to receive a clamping wheel 26 which as described below may have various forms.

The third frame 17 is formed of a U-shaped member 30 having parallel sides providing bearings for the axle 31 of a pulley 32. At its top the member 30 has a cross piece 33 (Fig. 2) from which arise rods 34 extending upwardly into tubes 35 which are guided freely for vertical movement in the cross piece 22. Each tube has a flange 36 adapted to rest against the plate 18. Between the constricted lower ends of the tubes 35 and the heads 37 of the rods 34 are compressed springs 38 which as shown diagrammatically in Figs. 12 to 16 always tend to cause the frame 17 to rise with respect to the frame 15. In order to accommodate the relative movement thus introduced between the two frames 16 and 17, the former is provided with slots 39 to accommodate the axles 31, the ends of the slots serving to limit the permissible longitudinal movement between the two frames, acting as stops 40 and 41 in the diagrammatic figures.

Figure 2:
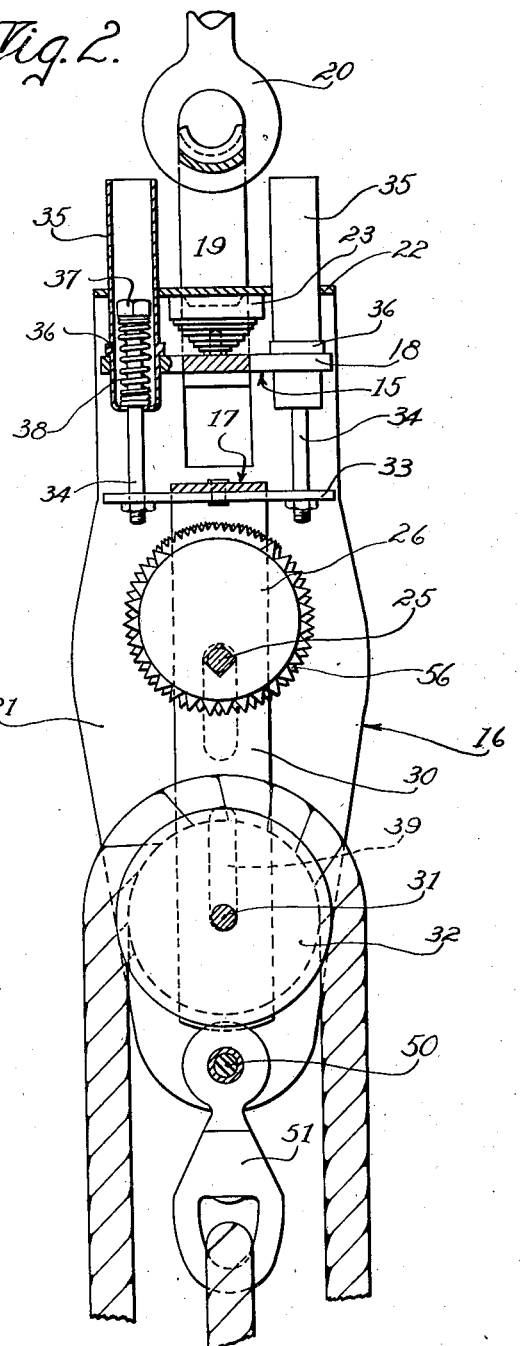
Fig. 2 is a longitudinal section through a single block showing the position of the parts when the block is under load.

In order to hold the clamping wheel 26 normally in the position of Fig. 2, one end of its axle is slotted at 45 to receive one end of each of a pair of spiral springs 46, one of which is shown in Fig. 6. The opposite ends of the springs are anchored to the frames 16 as at 47 and the springs are covered by a case 48. By using two springs a centralizing effect is obtained and an equal resistance is offered to displacement in either direction. Obviously other forms of centering devices could be used if desired.

In the case of a single pulley the frame 16, composed of the plates 21, is provided at its lower end with a cross bolt 50 supporting a swivel eye 51 to which a rope may be attached. In the case of a double pulley device, no such eye is necessary as the end of the rope is not to be fixed to the block. As will be seen from Fig. 9, the construction of the double block is generally the same as for a single block except that the plate 18 and the cross bolt 50 are made wide enough so that the two frames 15 and 16 act as units. The frames 17, however, preserve their independent character.

Referring particularly to Figs. 9, 10 and 11, provision is made in the double block construction for locking the frames 15 and 16 in their positions in which the volute spring is compressed, and for releasing them after a broken rope has been clamped. In this case the plate 18 on the frame 15 is provided with ears 60 to which are pivoted latching bars 61. These bars are pressed inwardly by springs 62 secured by brackets 63 on the plates 21, and when the frame 15 is raised relatively to the frame 16 the lower end of each bar will slip over a shoulder on a T-bar 64 held between two adjacent plates 21 of the frame 16. To release the latching bars they are provided with cam portions 65 engaged by flattened ends 66 on the axles 24. When either axle is rotated by the engagement of one of the spiked wheels with a rope, the latching bars will be separated and the frames released to the upward pull of the volute spring. As will appear below, though the frames 16 are now released for upward movement relative to frame 17, as long as there is a load on the pulley block, the frames 16 will not move upwardly and if the rope passing over the pulleys breaks, the bight of the rope will be thrown upwardly into engagement with one of the spiked wheels.

The operation of the device will be understood best from a consideration of the diagrammatic views (Figs. 12 to 16). Fig. 12 shows a single and a double block connected together but without any tension being exerted between them. In this condition the spring 23 forces the frames 15 and 16 apart and causes the pulley 32 to be separated from the clamping wheel 26 in spite of the fact that the springs 38 tend to cause the pulley and the wheel to approach each other. Fig. 13, as well as Figs. 2 and 3, show the condition when tension is applied to the rope. It will be obesrved that in the case of the single block at the bottom there are two forces acting vertically upwardly, that is the pull of the standing end 52 of the rope fall which is rove through the two blocks, and the upward pull of the bight 53 of rope around the sheave 32. In the case of the upper block there are two downward forces, the pull of the bight 54 of the intermediate part of the rope and the pull of the bight 55 between the intermediate part of the rope and the running end.

The normal operating position of the two blocks is shown in Fig. 13, it being understood that the eye 20 of the upper block is secured to some stationary point and the eye 20 of the lower block is secured to the object to be raised such as a scaffold. When the ropes are under tension the frames 17 are all moved to the limit permitted by the stops 41, the volute springs 23 are compressed, the springs 38 are also compressed, and the latching bars 61 are in the position of Fig. 11.

In Fig. 14 the running part of the rope is shown as having been broken. The tension on the sheave 32 around which the bight 55 passed is immediately released and the corresponding spring 38 causes the sheave to move rapidly into contact with the clamping wheel 26. It will be observed that this clamping wheel is eccentrically mounted and that it is provided with teeth 56 on its periphery. The specific operation under these conditions is best shown in Fig. 4, where it will be seen that the pull on the intermediate part of the rope will cause the clamping wheel to be rotated clockwise, forcing it tighter and tighter against the rope and holding the latter firmly against movement. The clamping wheel having once come in contact with the rope will continue to rotate around and on account of its eccentricity will remain in clamping position. The volute spring will initially remain compressed because of the action of the latching bars 61, but as soon as the rope is clamped will be released by the action of the cam end 66 of the axle 24. However, the frames 16 will not move upwardly relative to frames 15 and 17 because the load will hold the frames stationary by exerting tension on ropes 54 and 52 which through abutment 41 will counteract the effect of the volute spring.

In Fig. 15 an intermediate part of the rope is broken. The operation in this case is identical with that described above except that the other clamping wheel 26 of the double block comes into action. In Fig. 16 the parts of the rope between the bights 53 and 55 is broken. This brings into action both the sheave carrying the bight 55 and that carrying the bight 53, the two corresponding springs 38 expanding to bring their respective clamping wheels into action. The volute spring 23 of the single block is maintained in compressed condition by the pull of the standing part 52, while the spring 23 of the double block is initially held by the latching bars and then released as described above.

When it is desired to remove the broken rope it is only necessary to elevate the lower block to take the strain off the rope falls. As soon as this is done the blocks return to the position of Fig. 10 in which the sheaves are spaced from the clamping wheels and ample room is available to remove and replace the rope. It should be noted that for operation of the device as described it is necessary to use at least one double block in order to achieve complete protection. If two single blocks are used one of them has no rope attached to the eye 51 and there will be nothing to keep the volute spring compressed. Under these conditions the sheave 32 and the clamping wheel 26 are too far separated to have any clamping action. Where at least one double block is used, however, there are always two bights of the rope falls in operation and as shown in Fig. 14 one of them holds the volute spring of the single block compressed and therefore holds the frame 16 lowered and the clamping wheel in adjacency with its sheave. If two single blocks are to be used both of them should be provided with locking bars 61 in the same manner as described in connection with the double block.

If the rope is to be replaced by wire cable the spiked pulley is preferably replaced by a knurled or grooved wheel as shown at 70 in Fig. 8. If a chain is used the eccentric pulley is preferably formed to fit it as at 71 in Fig. 7.

I claim:

1. In a pulley rig, a safety pulley block comprising a supporting member adapted to be attached to an anchorage, a pair of spaced, superposed horizontal shafts below said supporting member, a gripping wheel and a pulley mounted in a common plane and respectively on the upper and lower shafts of said pair, the gripping wheel being eccentrically and the pulley concentrically mounted on the respective shafts, a first housing for said upper shaft and a second housing for said lower shaft, centering means tending to swing said gripping wheel around its pivot towards the position where the least radius from its pivot is radial to the lower shaft, separate spring means connecting each of said housings to the supporting member and normally holding said housings with the periphery of the pulley spaced sufficiently from the gripping wheel to permit easy passage of a rope between the gripping wheel and pulley when the gripping wheel is in the position determined by the centering means but permitting each housing to be pulled downwardly in a common plane against the tension of the spring means, and means for connecting said first housing to a load and for exerting tension on said housing as long as the load is raised off a supporting surface, whereby when the rope, passing over said pulley and holding said second housing downwardly, breaks, the bight of the rope will be carried upwardly into engagement with the gripping wheel by the spring means and will remain engaged with said gripping wheel as long as the first housing is held downwardly by the load.

2. In a pulley rig, a safety pulley block comprising a supporting member adapted to be attached to an anchorage, a pulley mounted for rotation on a horizontal shaft below the supporting member, a braking member for a rope carried over the pulley, said braking member being located between the pulley and the supporting member and in a common plane with the pulley, a first housing for the pulley shaft and a second housing for the braking member, separate spring means connecting each of said housings to the supporting member and normally holding said housings with the periphery of the pulley spaced sufficiently from the braking member to permit easy passage of the rope between the brake and pulley but permitting each housing to be pulled downwardly in a common plane against the tension of the spring means, and means for connecting said second housing to a load and for exerting tension on said housing as long as the load is raised off a supporting surface, whereby when the rope attached to the load and passing over said pulley and holding said first housing downwardly breaks, the bight of the rope will be carried upwardly into engagement with the braking member by the spring means and will remain engaged with said braking member as long as the second housing is held downwardly by the load.

3. In a pulley rig, a safety pulley block comprising a supporting member adapted to be attached to an anchorage, a pulley mounted for rotation on a horizontal shaft below the supporting member, a braking member for a rope carried over the pulley, said braking member being located between the pulley and the supporting member and in a common plane with the pulley, a first housing for the pulley shaft and a second housing for the braking member, separate spring means connecting each of said housings to the supporting member and normally holding said housings with the periphery of the pulley spaced sufficiently from the braking member to permit easy passage of the rope between the brake and pulley but permitting each housing to be pulled downwardly in a common plane against the tension of the spring means and means on said second housing for exerting tension on said housing and moving said housing to a position spaced downwardly from the normal position when said first housing is moved downwardly, latching means for releasably holding said second housing in said downward position, means operatively connected with said braking member for releasing said latching means when the rope, passing over said pulley and holding said first housing downwardly with the rope disengaged from the braking member, breaks and engages the braking member.

4. In a pulley rig, a safety pulley block comprising a supporting member adapted to be attached to an anchorage, a pulley mounted for rotation on a horizontal shaft below the supporting member, a braking member for a rope carried over the pulley and in a common plane with the pulley, a first housing for the pulley shaft and a second housing for the braking member, separate spring means connecting each of the housings to the supporting member and normally holding each of said housings in a first and elevated position adjacent the supporting member but permitting each housing to be pulled downwardly in a common plane against the tension of the spring means to a second and downwardly spaced position, the braking member and pulley in each position being sufficiently spaced to permit easy passage of the rope between the pulley and braking member and means for connecting said second housing to a load and for exerting tension on said housing and moving said housing to its second position as long as the load is raised off a supporting surface, whereby when the rope attached to the load and passing over said pulley and holding said first housing downwardly in its second position breaks, the bight of the rope will be carried upwardly into engagement with the braking member and will remain engaged with said braking member as long as the second housing is held in its lower position by the load.

5. In a pulley rigging, an upper pulley block and a lower pulley block, said upper pulley block consisting of: a supporting member to be attached to an anchorage, a first housing carrying a pair of gripping wheels mounted for rotation in parallel planes and eccentrically carried on independent horizontal axes in the housing and beneath the supporting member, a pulley for each gripping wheel and each mounted concentrically for rotation on a horizontal axis beneath the axis of its gripping wheel and in the plane of the gripping wheel, a second and a third housing for respectively supporting the two pulleys, centering means tending to swing each gripping wheel around its axis of pivot towards the position where the least radius from its pivot is radial to the pivot for the pulley, spring means connecting each of said housings to the supporting means and normally holding said housings with the periphery of each pulley spaced sufficiently from its gripping wheel to permit easy passage of a rope between the gripping wheel and pulley when the gripping wheel is in the position determined by the centering means but permitting each housing to be pulled downwardly with each pulley sliding in a common plane with its gripping wheel against the tension of the spring means, abutment means on the first housing arranged to abut against complementary abutments on the second and third housings when the housings are normally spaced and to prevent relative movement between the housings in a direction to further separate the respective gripping wheels and pulleys, said lower pulley block consisting of: a supporting member, means to attach a weight to the supporting member, a first housing carrying a gripping wheel eccentrically mounted for rotation on a horizontal axis above the supporting member, a second housing carrying a pulley concentrically mounted on a horizontal axis above the axis of the gripping wheel and in the plane of the gripping wheel, centering means tending to swing the gripping wheel around its axis of pivot towards the position where the least radius from its pivot is radial to the pivot for the pulley, spring means connecting each of said housings to the supporting member and normally holding said housings with the periphery of the pulley spaced sufficiently from its gripping wheel to permit easy passage for a rope between the gripping wheel and pulley when the wheel is in the position determined by the centering means, but permitting each housing to be pulled upwardly in a common plane from the supporting member against the tension of the spring means, and means for securing a rope to said first housing in the lower pulley block, and a rope attached to said last means and extending upwardly over one of the pulleys in the upper block, then downwardly and under the pulley in the lower block, and then upwardly and over the other pulley in the upper block with its free end extending outwardly of the upper block.

6. In a pulley rigging, an upper pulley block and a lower pulley block, said upper pulley block consisting of: a supporting member to be attached to an anchorage, a pair of housings each carrying a pulley mounted for rotation on a separate horizontal axis below the supporting member and in parallel planes, a braking member for each pulley and each located in a common plane with its pulley and between the pulley and the supporting member, a single housing for both braking members, spring means connecting each of the housings to the supporting means and normally holding the housings with the periphery of each pulley spaced sufficiently from its braking member to permit easy passage of a rope between each pulley and its braking member but permitting the housings to each be pulled downwardly with each pulley sliding in a common plane with its braking member against the tension of the spring means, abutments on the single housing arranged to abut against complementary abutments on the pair of housings when the housings are normally spaced and to prevent relative movement between the housings in a direction to further separate the respective pulleys and braking means, said lower pulley block consisting of: a supporting member, means to attach a weight to the supporting member, a first housing carrying a pulley mounted for rotation on a horizontal axis above the supporting member, a braking member for the pulley and located with the pulley and between the pulley and the supporting member, a second housing for the braking member spring means connecting each of the housings to the supporting member and normally holding the housings with the periphery of the pulley spaced sufficiently from the braking member to permit easy passage of a rope between the pulley and the braking member but permitting each housing to be pulled upwardly in a common plane from the supporting member against the tension of the spring means, and means for securing a rope to said second housing in the lower pulley block, and a rope attached to said last means and extending upwardly over one of the pulleys in the upper block, then downwardly and under the pulley in the lower block, and then upwardly and over the other pulley in the upper block with the free end of the rope extending outwardly of the upper block.

CHARLES DUBUQUE.